INVENTOR:
Klaus SCHNEIDER

BY his ATTORNY 3,667,723
ELECTROMAGNETIC DETENT MEANS FOR SLIDING SPOOLS OF DIRECTIONAL CONTROL VALVES
Klaus Schneider, Ludwigsburg, Germany, assignor to Robert Bosch G.m.b.H., Stuttgart, Germany
Filed Dec. 3, 1970, Ser. No. 94,913
Claims priority, application Germany, Dec. 11, 1969, P 19 62 069.0
Int. Cl. F16k *31/44*
U.S. Cl. 251—68                                17 Claims

ABSTRACT OF THE DISCLOSURE

A detent device for the sliding spool of a directional control valve wherein the spool is permanently biased to a neutral position and is movable to two operative positions. The detent device has an armature which is mounted on the spool and is movable toward a first or a second electromagnet in the valve housing in response to movement of the spool to the one or the other operative position. The electromagnets are automatically energized shortly before the spool reaches an operative position, and at least one electromagnet can be deenergized with a fixed or variable delay following energization to permit a resetting spring to return the spool to its neutral position. Alternatively, the spool can carry an electromagnet which is movable against a first or a second armature in the housing when the spool moves toward its first or second operative position. The electromagnet is energized shortly before it reaches the one or the other armature.

BACKGROUND OF THE INVENTION

The present invention relates to means for releasably holding valve members in selected positions, particularly for holding sliding spools of directional control valves in one or more operative positions. Still more particularly, the invention relates to electromagnetic detent devices for sliding spools or similar valve members, especially for valve members which are permanently biased to a neutral position.

It is already known to employ an electromagnet for the purpose of terminating the action of a conventional detent device, for example, a detent device wherein a ball is biased by a spring to thereby hold a sliding spool in a selected position. The electromagnet serves to move the ball against the opposition of the spring to thereby permit a movement of the spool from its selected position. As a rule, the electromagnet has a sleeve-like armature which entrains the ball against the opposition of the spring when the electromagnet is energized. The electromagnet must be deenergized if the spool is to be returned to and retained in the selected position; the ball then snaps into a suitable recess in the spool and holds it in the selected position. A drawback of such detent devices is that they are bulky and that their mechanical parts are subjected to considerable wear.

Pat. No. 3,305,209 to Bender et al. discloses a valve wherein the spool is movable between two end positions by electromagnetic means and can be releasably held in each of its two positions by a permanent magnet. The means for moving the spool comprises two pairs of electromagnets one pair of which serves to overcome the action of permanent magnets when it is desired to move the spool away from the respective end position. The just described structure cannot be used in a directional control valve wherein the spool must be moved between three positions and it does not have any means for automatically urging the spool to one of its positions. Furthermore, the electromagnets do not serve as detent means for the spool and the permanent magnets occupy too much room, especially if the spool must be held in its end positions with a substantial force. Still further, the permanent magnets affect the operation of electromagnets and prevent accurate timing of movements of the spool from its end positions.

SUMMARY OF THE INVENTION

An object of the invention is to provide a novel and improved detent device for holding the valve member of a valve, particularly the sliding spool of a directional control valve, in one or more selected positions.

Another object of the invention is to provide an electromagnetic detent device for the spool of a directional control valve.

A further object of the invention is to provide a detent device which is particularly suited for use in valves wherein a spool or an analogous valve member is movable between more than two positions and is permanently biased to one of its positions.

An additional object of the invention is to provide a compact, simple, relatively inexpensive, rugged and reliable detent device which can be installed in or combined with presently known valves.

An additional object of the invention is to provide a detent device whose retaining action can be started and/or terminated in a fully automatic way.

Still another object of the invention is to provide a detent device which consumes small amounts of energy, which can retain the valve member in one or more selected positions with a requisite force, and whose parts are subjected to less wear and can stand longer use than presently known detent devices.

The invention is embodied in a valve, particularly in a directional control valve, which comprises a housing or body, a spool or an analogous valve member movable in the housing between first and second operative positions and through an intermediate or neutral position, a resetting device mounted in the housing for permanently biasing the valve member to its neutral position, an actuating device for moving the valve member from neutral position to the first or second operative position, and a novel detent device for yieldably holding the valve member in at least one operative position whereby the detent device opposes the bias of the resetting device. The detent device comprises armature means and electromagnet means; one of these means is mounted in the housing and the other means is mounted on the valve member to approach the one means when the valve member is caused to move toward its one operative position. The one means attracts the other means in response to energization of the electromagnet means to thereby hold the valve member in the one operative position. The detent device further comprises means for at least temporarily energizing the electromagnet means in the one operative position of the valve member.

If the electromagnet means is mounted on and shares the movements of the valve member, it can be flanked by two stationary armatures one of which attracts the electromagnet means in the one operative position and the other of which attracts the electromagnet means in the other operative position of the valve member as soon as the electromagnet means is energized. If the armature means is mounted on the valve member, it can be flanked by two electromagnets one of which attracts the armature means in the one operative position and the other of which attracts the armature means in the other operative position of the valve member as soon as the respective electromagnet means is energized.

The novel features which are considered as characteristic of the invention are set forth in particular in the appended claims. The improved detent device itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
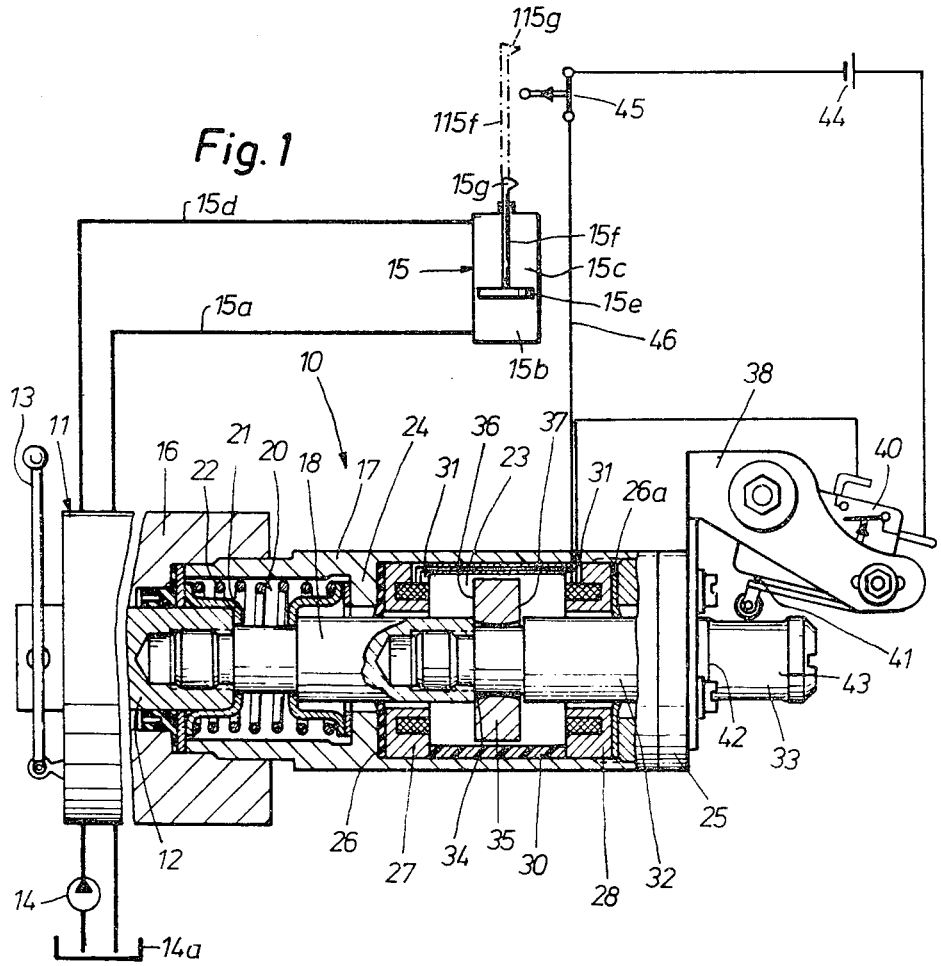
FIG. 1 is a diagrammatic partly side elevational and partly sectional view of a sliding spool directional control valve having a detent device which embodies one form of the invention.

FIG. 1 illustrates a 4/3 sliding spool directional control valve 11 having a detent device 10 which embodies one form of the present invention. The valve 11 includes a housing or body having a main portion 16 for a reciprocable valve member or spool 12 which is movable between two end positions or operative positions and through an intermediate or neutral position (shown in FIG. 1) which is located between (preferably midway between) the two operative positions. The actuating device which can move the spool 12 to the desired operative position comprises a two-armed lever 13 which is fulcrumed on the main housing portion 16 and can be pivoted by hand in a clockwise or in a counterclockwise direction. When it is caused to pivot in clockwise direction, as viewed in FIG. 1, the lever 13 causes the spool 12 to move to its right-hand operative position whereby the spool permits a pressurized fluid to flow from a pump 14 or an analogous source of pressurized fluid through a conduit 15a and into the lower chamber 15b of a consumer, here shown as a double-acting hydraulic cylinder 15. When the lever 13 is pivoted in a counterclockwise direction, as viewd in FIG. 1, the spool 12 is caused to move to its left-hand operative position whereby the pump 14 delivers pressurized fluid to the upper chamber 15c of the cylinder 15 by way of a second conduit 15d; at the same time, the spool 12 connects the conduit 15a with a tank 14a from which the fluid is being drawn by the pump 14. The exact construction of the heretofore described parts of the valve 11 forms no part of the present invention.

The major part of the detent device 10 is installed in a sleeve-like extension 17 of the main portion 16 of the valve housing; the latter further comprises a ring-shaped cover or end wall 25 which is attached to the right-hand end of the sleeve 17. The valve member 12 comprises a first extension 18 which defines with the surrounding portion of the sleeve 17 a first annular chamber 20 and a second extension 32 which defines with the surrounding portion of the sleeve 17 a second annular chamber 23. The two chambers are separated from each other by a ring-shaped wall or partition 24 of the sleeve 17. The extension 32 is threadedly connected with the extension 18 and the latter is threadedly connected with the main (left-hand) part of the spool 12. The chamber 20 accommodates the helical spring 22 of a conventional resetting device 21 which serves to permanently bias the spool 12 to the illustrated neutral position. The spring 22 is stressed when it expands in response to movement of the spool 12 to its left-hand operative position as well as when it is compressed in response to movement of the spool 12 to its right-hand operative position. The rightmost extension 32 of the spool 12 has an end portion or tip 33 which extends through and beyond the ring-shaped cover 25 of the valve housing.

The chamber 23 accommodates two sealing rings 26, 26a which are respectively adjacent to the partition 24 and cover 25 and are in sealing engagement with the extensions 18, 32 to prevent entry of foreign matter into the chamber 23. The detent device 10 comprises two ring-shaped electromagnets 27, 28 which are fixedly mounted in the sleeve 17 of the valve housing and are respectively adjacent to the sealing rings 26, 26a. The electromagnets 27, 28 are held apart by a hollow cylindrical distancing member 30 which is adjacent to the internal surface of the sleeve 17 in the chamber 23 and consists of insulating synthetic plastic material. The distancing member 30 contains electric conductor wires 31 which connect the electromagnet 27 into a circuit 46. The electromagnet 28 is also connected in the circuit 46, either in series or in parallel with the electromagnet 27.

The extension 18 and/or 32 of the valve member 12 is formed with a circumferential groove 34 which is bounded by a concave annular surface and is located substantially or exactly midway between the electromagnets 27, 28 when the spring 22 is free to maintain the valve member 12 in the illustrated neutral position. The groove 34 receives the radially innermost portion of a steel disk 35 which constitutes the armature for the electromagnet 27 or 28 and is bounded by two parallel end surfaces 36, 37 which respectively face the electromagnets 27, 28. The innermost portion of the armature 35 is bounded by a convex annular surface whose curvature exceeds the curvature of the concave surface in the groove 34 so that the armature 35 can be tilted in any desired direction not unlike a wobble plate or swash plate to insure that its surface 36 or 37 can be moved into full face-to-face abutment with the electromagnet 27 or 28 when the valve member 12 is respectively moved to its left-hand and right-hand operative position. In order to further enhance proper adherence of the armature 35 to the electromagnet 27 or 28 when the respective electromagnet is energized, the distance between the surface 36 and electromagnet 27 or the surface 37 and electromagnet 28 in neutral position of the spool 12 is slightly less than the maximum possible extent of movement of the spool from neutral position to the respective operative position.

The circuit 46 further includes a conventional limit switch 40 which is mounted on a bracket or an analogous support 38 secured to the cover 25 of the valve housing. The limit switch 40 is open in the neutral position of the spool 12 but closes automatically in response to movement of the spool to either of its operative positions. To this end, the limit switch has a movable contact 41 provided with a roller follower which tracks the periphery of the end portion 33 of the extension 32. The end portion 33 is provided with two ring-shaped cams 42, 43 each of which causes the limit switch 40 to close when engaged by the roller follower of the movable contact 41. Still further, the circuit 46 includes an energy source 44 and an interrupter switch 45 which is normally closed and can be opened by a trip 15g on the piston rod 15f of the piston 15e in the double-atcing cylinder 15 when the piston 15e moves toward its upper end position (as shown in FIG. 1) in response to admission of pressurized fluid into the chamber 15b.

The switches 40, 45 are in series with the electromagnets 27, 28 and energy source 44 of the circuit 46.

The operation:

When the actuating lever 13 is pivoted by hand in a clockwise direction, the spool 12 is moved toward its right-hand operative position to permit the flow of pressurized fluid from the pump 14, through the conduit 15a and into the chamber 15b whereby the piston 15e moves upwardly and advances the trip 15g at the free end of the piston rod 15f toward the normally closed interrupter switch 45. Such pivoting of the lever 13 takes place against the opposition of the spring 22 which stores energy and tends to return the spool 12 to the neutral position. The extensions 18, 32 share the axial movement of the spool 12 to its right-hand operative position whereby the armature 35 moves toward the electromagnet 28 which is energized as soon as the roller follower of the movable contact 41 causes the limit switch 40 to close and to complete the circuit 46. The electromagnet 28 attracts the armature 35 with a force which is stronger than the bias of the spring 22 so that the valve member 12 remains in its right-hand operative position until the trip 15f of the rising piston rod 15f opens the interrupter switch 45 to thereby open the circuit 46 and to deenergize the electromagnets 27, 28. The spring 22 is then free to return the spool 12 to its neutral position whereby the spool can seal the pump 14 from the chambers 15b and 15c. The arrangement is preferably such that the limit switch 40 closes and energizes the electromagnets 27, 28 shortly or immediately before the spool 12 reaches its right-hand operative position. When the electromagnet 28 is energized, its left-hand surface is in full face-to-face abutment with the surface 37 of the armature 35; this is possible because the armature is free to wobble on the extensions 18, 32 of the spool 12. Energization of the electromagnet 27 in the right-hand operative position of the spool 12 is of no consequence because the armature 35 is attracted by the electromagnet 28. As soon as the spring 22 of the resetting device 21 is free to return the spool 12 to its neutral position (i.e., as soon as the trip 15g opens the interrupter switch 45), the limit switch 40 also opens because the end portion 33 of the extension 32 returns to the position shown in FIG. 1.

It is clear that the operator can deenergize the electromagnet 28 before the trip 15g opens the switch 45, for example, in order to arrest the piston 15e in a position somewhere between the illustrated position and the upper end position. This can be achieved by returning the lever 13 to the illustrated position whereby the operator's hand must overcome the attraction between the armature 35 and the energized electromagnet 28.

If the user decides to pivot the actuating lever 13 in a counter clockwise direction to thereby move the spool 12 from neutral position to the left-hand operative position, the armature 35 is caused to travel toward the electromagnet 27 which is energized as soon as the limit switch 40 is closed by the cam 43 on the end portion 33 of the extension 32. The electromagnet 27 then attracts the armature 35 and its right-hand surface is in full face-to-face abutment with the surface 36 because the armature is free to wobble on the spool 12. It is assumed that the piston 15e dwells in an intermediate position at the time when the user decides to move the spool 12 to its left-hand operative position, i.e., that the interrupter switch 45 is closed. If the switch 45 is open at the time when the spool 12 reaches its left-hand operative position and closes the limit switch 40, the switch 45 closes immediately or with a minimal delay to complete the circuit 46 and to energize the electromagnet 27 because the pump 14 is free to deliver pressurized fluid into the chamber 15c so that the piston 15e moves the piston rod 15f and the trip 15g downwardly and allows the switch 45 to close. Energization of the electromagnet 28 in the left-hand end position of the spool 12 is of no consequence because the armature 35 is attracted by the adjacent electromagnet 27. The attraction between the parts 27, 35 is strong enough to overcome the bias of the spring 22 which tends to return the spool 12 to its neutral position. The spool returns to such neutral position in response to deenergization of the electromagnet 27, i.e., in response to pivoting of the lever 13 in a clockwise direction until the cam 43 on the end portion 33 of the extension 32 permits the limit switch 40 to open. It will be seen that the detent device 10 of FIG. 1 is capable of yieldably maintaining the spool 12 in each of its operative positions, that the spool 12 is automatically permitted to reassume its neutral position after a predetermined period of dwell in the right-hand operative position, and that the period of dwell of the spool 12 in its left-hand operative position is determined by the user who must pivot the lever 13 by hand in order to deenergize the electromagnet 27.

As stated before, the sealing elements 26, 26a prevent entry of dust, moisture and other foreign matter into the chamber 23 between the partition 24 and cover 25. Since the armature 35 acts not unlike a wobble plate, it can properly adhere to the electromagnet 27 or 28 even if the surfaces in the groove 34 and on the innermost portion of the armature are not machined or otherwise finished with a high degree of precision.

The detent device 10 comprises fewer parts than presently known detent devices for sliding spools of directional control valves, and its parts are subjected to little wear so that the detent device can stand long periods of frequent use. The device 10 occupies little room and its ruggedness and reliability at least match those of presently known detent devices for sliding spools. Moreover, the parts of the device 10 need not be machined with a high degree of precision. The energy consumption is low because the electromagnets 27, 28 are energized shortly before the spool 12 reaches an operative position. The return movement of the spool 12 can be determined in advance with a high degree of precision because the spring 22 is free to shift the spool 12 as soon as the electromagnet 27 or 28 is deenergized, either in response to pivoting of the actuating lever 13 or in automatic response to opening of a switch in the circuit 46.

The armature 35 is preferably a permanent magnet. This renders it possible to reduce the size of the electromagnets 27, 28 without reducing the force with which the spool 12 is held in the selected operative position. The force with which the armature 35 (if it constitutes a permanent magnet) is attached to the electromagnet 27 or 28 when the circuit 46 is open is weaker than the bias of the spring 22 so that the spool 12 can reassume its neutral position.

Figure 2:
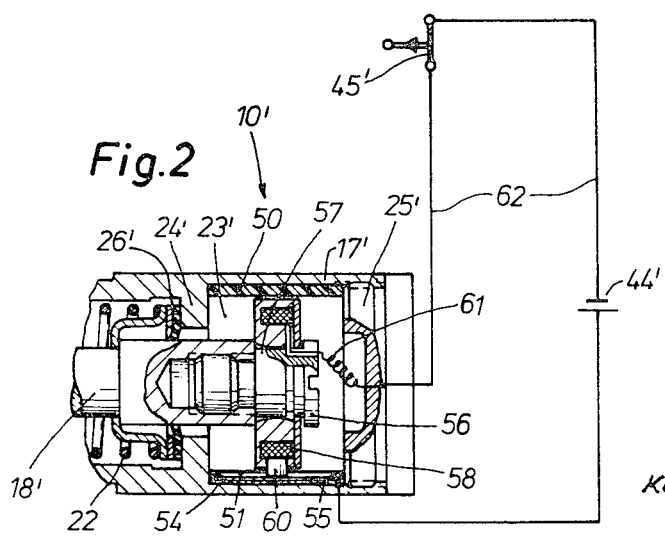
FIG. 2 is a fragmentary sectional view of a second sliding spool directional control valve having a modified detent device.

FIG. 2 illustrates a portion of a second directional control valve which embodies a modified detent device 10' constituting a space-saving compact simplification of the detent device 10.

The chamber 23' between the partition 24' and cover 25' contains a cylindrical distancing member 50 which is immediately adjacent to the internal surface of the sleeve 17' and is provided with an axially parallel internal groove 51. The left-hand and right-hand axial ends of the groove 51 respectively contain electric contacts 54, 55. The spool 12 (not shown in FIG. 2) has a single axial extension 18' which is connected with a screw or bolt 56. The head of the screw 56 and/or the adjacent portion of the extension 18' is formed with a circumferential groove 57 which is bounded by an annular concave surface and receives the radially innermost portion of a ring-shaped electromagnet 58 which is mounted not unlike a wobble plate so that it can be tilted in an infinite number of directions and is also free to perform a relatively small axial movement with reference to the spool. The innermost portion of the electromagnet 58 is preferably bounded by an annular convex surface. The electromagnet 58 has a radially outwardly extending contact 60 which is received in and guided by the internal groove 51 of the distancing sleeve 50 and can engage the contact 54 or 55, depending upon whether the actuating lever 13 (not shown in FIG. 2) is caused to move the spool to its left-hand or right-hand operative position. An electric circuit 62 has a flexible conductor wire 61 which is connected with the winding of the electromagnet 58. The circuit 62 further comprises an energy source 44' and an interrupter switch 45' which can be actuated in the same way as described in connection with the switch 45 of FIG. 1. A sealing ring 26' sealingly engages the extension 18' and its adjacent to the left-hand side of the partition 24' to prevent the penetration of foreign matter into the chamber 23'. Each of the parts 24', 25' consists of magnetizable material or is a permanent magnet and can constitute the armature of the reciprocable electromagnet 58.

The operation of the detent device 10' shown in FIG. 2 is as follows:

The electromagnet 58 is energized when its contact 60 engages the fixed contact 54 or 55 i.e. when the spool is caused to assume its left-hand or right-hand operative position. The contacts 54, 55 are connected with one pole of the energy source 44' and the conductor 61 is connected with the other pole of the energy source when the interrupter switch 45' is closed. The arrangement is preferably such that the electromagnet 58 is energized shortly before the spool reaches the respective operative position (provided that the switch 45' is closed). The armature 24' or 25' then attracts the energized electromagnet 58 and causes the spool to dwell in the respective operative position until the switch 45' opens the circuit 62 or until the operator decides to move the spool from the other end position by way of the actuating lever.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. In a valve, particularly in a sliding spool directional control valve, a combination comprising a housing; a valve member movable in said housing between first and second operative positions and through a neutral position; a resetting device for biasing said valve member to said neutral position; an actuating device for moving said valve member from said neutral position to said operative positions; and a detent device for releasably holding said valve member in at least one of said operative positions against the bias of said resetting means, comprising armature means and electromagnet means, one of said means being mounted on said housing and the other of said means being mounted on said valve member to approach said one means in response to movement of the valve member to said one operative position, said one means being arranged to attract said other means in response to energization of said electromagnet means to thereby hold said valve member in said one operative position, and means for at least temporarily energizing said electromagnet means in said one operative position of the valve member.

2. A combination as defined in claim 1, wherein said energizing means comprises a normally open electric circuit and means for completing said circuit to thereby energize said electromagnet means in response to movement of said valve member from said neutral position toward said one operative position.

3. A combination as defined in claim 1, wherein said armature means comprises at least one permanent magnet which attracts said electromagnet means in said one operative position of said valve member with a force which is weaker than the bias of said resetting device in deenergized condition of said electromagnet means.

4. A combination as defined in claim 1, wherein said other means is mounted on said valve member with limited freedom of movement in a plurality of directions.

5. A combination as defined in claim 4, wherein said other means is tiltable with reference to said valve member.

6. A combination as defined in claim 1, wherein said resetting device and said energizing means are supported by said housing.

7. A combination as defined in claim 1, wherein said other means is said armature means and said electromagnet means comprises two electromagnets which flank said armature means, said energizing means comprising means for at least temporarily energizing one of said electromagnets in said one operative position of said valve member in which said armature means is adjacent to said one electromagnet and for at least temporarily energizing the other electromagnet in the other operative position of said valve member in which said armature means is adjacent to said other electromagnet.

8. A combination as defined in claim 7, wherein said housing defines a chamber which surrounds said valve member and said armature means and wherein said electromagnets are mounted in said chamber.

9. A combination as defined in claim 8, wherein said housing comprises two walls each located at one end of said chamber and wherein each of said electromagnets is adjacent to one of said walls, each of said electromagnets being a ring-shaped electromagnet.

10. A combination as defined in claim 8, wherein a portion of said valve member extends from said chamber and constitutes a portion of said energizing means.

11. A combination as defined in claim 10, wherein said energizing means further comprises a normally open switch in circuit with said electromagnets and said portion of said valve member is arranged to close said switch in each operative position of said valve member to thereby energize said electromagnets.

12. A combination as defined in claim 11, wherein said switch is a limit switch mounted on said housing, said limit switch being open in the neutral position of said valve member.

13. A combination as defined in claim 1, wherein said other means is said electromagnet means and said armature means comprises two armatures flanking said electromagnet means, said energizing means being arranged to energize said electromagnet means in said one operative position of said valve member when said electromagnet means is adjacent to one of said armatures and to energize said electromagnet means in the other operative position of said valve member when said electromagnet means is adjacent to the other armature whereby the respective armature attracts said electromagnet means in response to energization of the latter.

14. A combination as defined in claim 13, wherein said housing defines a chamber which surrounds said valve member and accommodates said electromagnet means, said housing having two walls each disposed at one end of said chamber and each constituting one of said armatures.

15. A combination as defined in claim 14, wherein said energizing means comprises portions disposed in said chamber.

16. A combination as defined in claim 1, wherein said energizing means includes an electric circuit for said electromagnet means, said circuit including normally closed interrupter switch means and means for opening said switch means to thereby deenergize said electromagnet means with a delay following energization of said electromagnet means.

17. A combination as defined in claim 16, wherein said means for opening said switch means comprise a consumer which is connectable with and disconnectable from a source of pressurized fluid by way of said housing in response to movement of said valve member between said positions thereof.

References Cited
UNITED STATES PATENTS

| | | | |
|---|---|---|---|
| 2,836,194 | 5/1958 | Jaden | 251—68 X |
| 3,082,627 | 3/1963 | Yeo et al. | 251—67 X |
| 3,434,390 | 3/1969 | Weiss | 251—137 X |
| 3,534,770 | 10/1970 | Kowalski | 251—130 X |

HENRY T. KLINKSIEK, Primary Examiner

U.S. Cl. X.R.

91—358 A, 392